United States Patent [19]

Cook et al.

[11] 4,433,787

[45] Feb. 28, 1984

[54] COIN OPERATED BICYCLE LOCKING RACK

[76] Inventors: Steven F. Cook, 6646 N. Clark, Chicago, Ill. 60626; Glen E. Burlingame, 2858 W. 55th Street, Chicago, Ill. 60632

[21] Appl. No.: 270,967

[22] Filed: Jun. 5, 1981

[51] Int. Cl.³ .............................................. E05B 73/00
[52] U.S. Cl. ........................................ 211/5; 70/235; 70/389; 194/40; 248/553
[58] Field of Search ...................... 211/4, 5, 17, 18, 19, 211/20, 21, 22; 70/389, 233, 234, 235, DIG. 41, 62; 194/40, 49, 64; 248/551, 552, 553

[56] References Cited

U.S. PATENT DOCUMENTS

| | | | |
|---|---|---|---|
| 3,802,232 | 4/1974 | Mattson et al. | 194/40 X |
| 3,815,721 | 6/1974 | Montoya et al. | 194/40 |
| 3,820,662 | 6/1974 | Steers | 211/5 |
| 3,827,773 | 8/1974 | Aiello | 70/234 X |
| 3,865,245 | 2/1975 | Lieb et al. | 211/5 |
| 3,887,075 | 6/1975 | Harvey | 211/5 |
| 3,970,197 | 7/1976 | Bale, Jr. | 211/5 |

Primary Examiner—J. Franklin Foss
Assistant Examiner—David L. Talbott
Attorney, Agent, or Firm—Neuman, Williams, Anderson & Olson

[57] ABSTRACT

A locking bicycle rack comprises a plurality of individual bicycle stalls each including a bifurcated swing arm which is pivotally mounted to traverse the stall and engage both wheels and the frame of a bicycle positioned within the stall. The swing arms engage a locking mechanism which includes a latch to maintain the swing arms across the stalls while the stalls are unoccupied. Upon receipt of a predetermined number of coins, a centrally located stall selection mechanism allows selection of an unoccupied stall and operation of the associated latch to release the selected stall. Each locking mechanism includes a guard cap which surrounds, protects and operates an associated lock. Operation of the locks as well as lock securing pins is via cam surfaces within the guard caps. Each lock is operated by a key which is captured within the guard cap while a stall is unoccupied.

15 Claims, 12 Drawing Figures

COIN OPERATED BICYCLE LOCKING RACK

BACKGROUND OF THE INVENTION

This application is directed to a coin operated, locking bicycle rack.

In view of the energy shortage and the emphasis on exercise in our society today, it is not surprising that a large number of bicycles are in use in this country. Due to inflation and the increasing sophistication of bicycle designs, the cost of bicycles is also at an all-time high. This combination of demand, availability and relatively high cost makes the bicycle an attractive target for thieves.

Although a variety of coin operated bicycle racks are available, none of these racks have provided the proper combination of security, ease of operation and deterrence to vandalism to be generally available for use by bicycle riders. Instead, each rider must generally carry a relatively heavy chain or cable and an associated padlock or locking device to secure his bicycle to a fixed object such as a tree or post. With the lighter weight bicycles which are popular today, often times the chain or cable may well weigh as much as the bicycle and prove to be very inconvenient for carrying on that bicycle. Accordingly, a highly secure, coin operated bicycle rack which has a low susceptibility to vandalism, would be welcomed by bicycle riders and would encourage the use of bicycles to conserve energy and improve health. Also, the provision of such a bicycle rack by a theater or store owner would encourage riders to patronize the business establishment and serve as a competitive edge over those who did not provide such a rack.

SUMMARY OF THE INVENTION

The coin operated locking bicycle rack of this invention comprises a framework which defines a plurality of bicycle stalls, each of the stalls for receiving a bicycle to be locked within the stall. Each stall includes a bifurcated swing arm which is pivotally mounted to one side of the stall and adapted to pivot between a position clear of the stall and a position where the arms extend across the stall and through both wheels and the frame of a bicycle positioned within the stall. The other side of each stall includes a locking mechanism which engages the swing arms to securely lock the bicycle within the stall and prevent its theft.

Each lock is controlled by a centrally located stall selection device which allows a rider to select an idle stall by rotation of a stall selection handle. Once a stall has been so selected, a preset number of coins must be deposited in the selection device, before the selected stall may be initially unlatched. Once a stall is selected and the preset number of coins are deposited, the stall selection handle is pulled to release a latch within the locking mechanism of the selected stall via one of a plurality of cables which extend between the stall selection device and the individual stalls. The latch maintains the swing arms in a closed position while the stall is idle to prevent nonpaying bicycle riders from using the rack. Otherwise a bicycle could be pseudo locked within an idle stall by inserting a bicycle within the stall and placing the swing arms through the bicycle or by using one's own cable or chain to secure the bicycle within the stall. Each locking mechanism also includes a key operated lock which secures the swing arms through both wheels and the frame of a bicycle inserted within a selected stall to prevent its removal.

Each locking mechanism includes a lock protecting guard cap which also serves to capture the key therein while the stall is idle. Operation of the lock to unlock a stall can only be accomplished by initially inserting a special key and turning the guard cap. The lock is locked by turning the guard cap in the opposite direction. A cam surface on the inside face of the guard cap contacts the special key and depresses the key and lock cylinder to lock the lock as the guard cap is rotated.

The operation of unlocking the stall inserts a stop pin into the edge flange of the guard cap and prevents further rotation of the guard cap. With the guard cap thus demobilized, access to the key through an elongated access hole in the guard cap is impossible. The guard cap system serves as an effective deterrent to vandalism by providing mechanical security for a simple, inexpensive lock.

Rotation of the guard cap to unlock a stall also removes a spring loaded security pin from the lock cylinder by means of a cam surface on the inside of the sidewalls of the guard cap. Furthermore, the special key comprises a cylindrical housing closed at one end with a shortened or truncated key secured to the interior end of the closed end. These features enhance the security of the lock by preventing picking when the lock is accessible and discouraging duplication of keys, which duplication is impossible on standard key cutting machines.

A wire operating member is secured to the outside of the cylindrical housing to complete the special key. This wire operating member allows a user to conveniently remove the key from the lock and is engaged by a tab secured inside the sidewall of the guard cap to turn the key and unlock the associated lock. As the guard cap is rotated, the security pin is withdrawn from the lock cylinder to allow rotation of the lock cylinder and movement of the lock to unlock a stall. After the pin is removed by a partial rotation of the guard cap, the wire operating member on the inserted key, which is then fully enclosed within the guard cap, is engaged and turned by the tab within the guard cap to unlock the lock and accordingly the associated stall. Slight rotation of the guard cap beyond the unlocked position engages the guard cap locking pin with a cut out in the edge or flange of the guard cap to prevent its rotation and capture the key within the guard cap to thereby prevent its removal by a nonpaying person or vandalism to the key. The guard cap cannot be rotated until that stall has again been selected, a preset number of coins have been deposited in the stall selection device and the stall selection device activated.

The stall selection device includes a coin rejector which allows a stall selection handle to be pulled only upon the insertion of a preset number of coins. The pull handle is rotated to engage a given one a plurality of operating cables, each of which extends to a corresponding one of the stalls. Rotation of the handle positions a slotted finger or fork tn engage and select one of a plurality of cable retaining members. A short pull of the selection handle pulls the selected cable retaining member and the associated cable which is routed to the corresponding stall within a covering sheath. The cables are individually routed to the stalls. Stall numbers coordinated with the cables are provided on the face of the selection mechanism so that a given idle stall can be selected. The pull handle is spring loaded and returns to its original position after being pulled. Upon return to its original position, the coin rejector is reset to allow for the next operation of the bike rack. An occupied stall cannot be operated since the selection mechanism can only operate the latch mechanism and has no control over the key operated lock of the locking mechanism.

BRIEF DESCRIPTION OF THE DRAWING

The invention will be better understood by reading the detailed description of the illustrative embodiment with reference to the drawing in which.

It should be understood that the drawing figures are not necessarily to scale and that certain details which are not necessary for an understanding of the present invention or would render other details difficult to understand have been omitted.

DETAILED DESCRIPTION OF THE ILLUSTRATIVE EMBODIMENT

Figures 1, 1A:
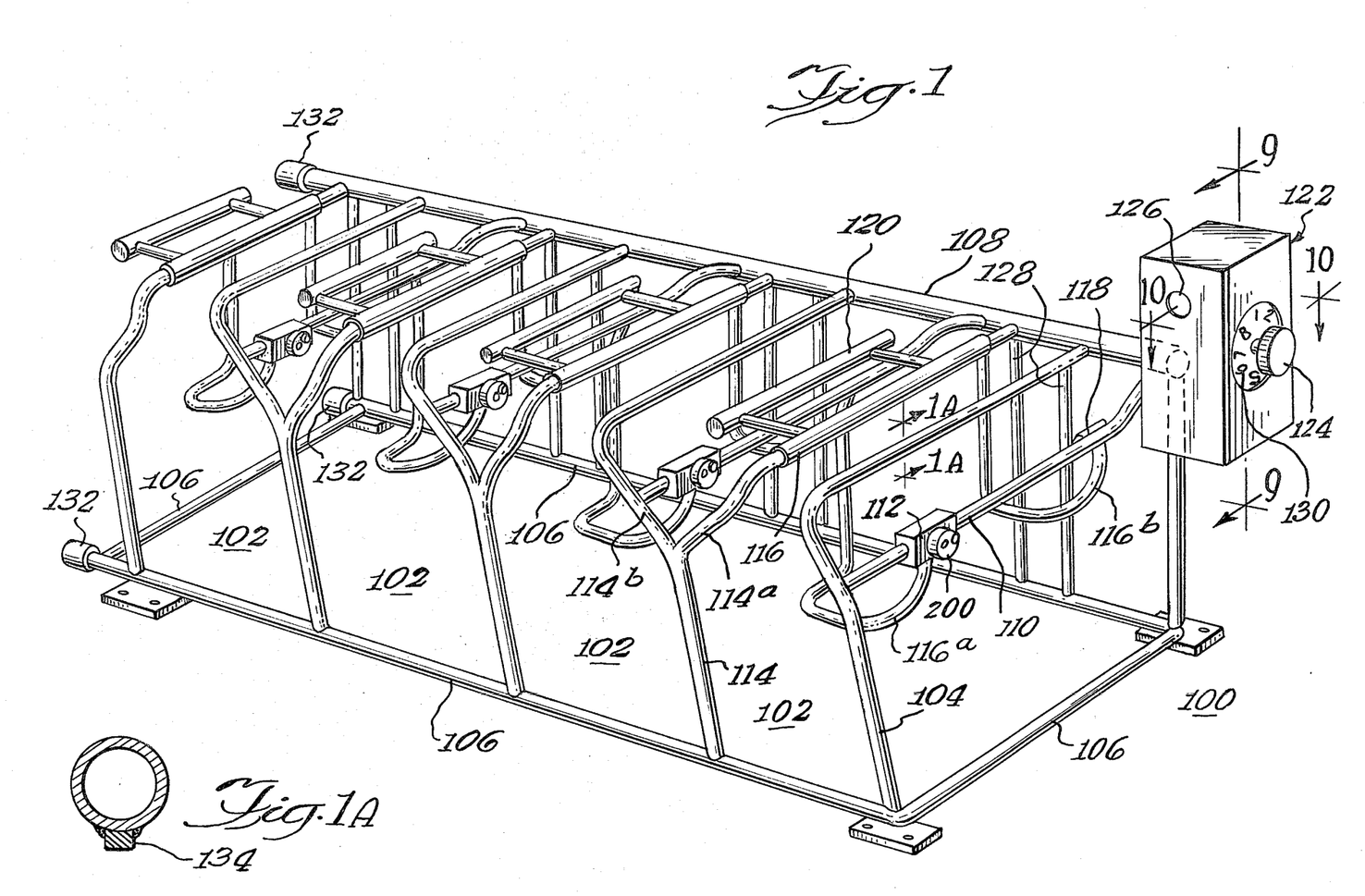
FIG. 1 is a pictorial view of a four stall bike rack in accordance with the present invention.
FIG. 1A is a cross section of a tubular member of FIG. 1 with a hardened member welded thereto for security.

FIG. 1 shows a four stall coin operated bike rack 100 in accordance with the present invention. The stalls 102 of the bike rack are formed from a preferably welded framework comprised of generally tubular steel or other high strength material. Since the stalls 102 are essentially identical to one another, the construction and operation of the bike rack will be described with primary reference to the rightmost stall 102 of FIG. 1.

The rightmost stall 102 is formed by a generally L-shaped tubular member 104 which is secured at its base to a generally rectangular frame 106 and, at its elevated end, is similarly secured to a horizontally extending tubular member 108. A locking tubular member 110 extends between and is secured to the L-shaped tubular member 104 and the member 108. A locking mechanism 112, which will be fully described hereinafter, is securely inserted into the tubular member 110 and provides a cable controlled latch and key locking arrangement for the rightmost stall 102.

A second generally Y-shaped tubular member 114 having its base secured to the rectangular frame 106 and its upper arms 114a, 114b extending rearwardly and being secured to the tubular member 108, defines the left side of the rightmost stall 102. A bifurcated swing arm 116 is pivotally mounted to the upper arm 114a of the tubular member 114 and includes a forward arm 116a which engages the locking mechanism 112 and a rearward arm 116b which engages a metal housing 118 mounted on tubular member 110. The bifurcated swing arm 116 includes a counterweight 120 which forces the arms 116a and 116b into the locking mechanism 112 and the housing 118 respectively under the force of gravity. Although the housing 118 contains no locking device, it can be formed to resemble the locking mechanism 112 to give the appearance of additional strength and security to discourage would-be thieves.

When a bicycle is to be inserted into the rightmost stall 102, that stall is selected via a stall selection device 122 with the specific stall being selected by rotation of the knob 124. As shown, the knob points to or indicates stall 1 which could correspond to the rightmost stall 102 of the bike rack 100. Coins are deposited into the coin receptacle 126 until a defined amount has been deposited as required by a coin rejector mechanism within the stall selection device 122. At that time, the knob 124 is pulled in a rightward direction as shown in FIG. 1 to operate a cable which extends from the stall selection device 122 through the tubular members 108 and 110 to release a latch within the locking mechanism 112 as will be fully described hereinafter.

Once the latch has been released, the swing arms 116a and 116b are swung out of the stall 102 into the space provided between the upper arm 114a and the upper arm 114b of the tubular member 114. A bicycle is then inserted into the rightmost stall 102 with its front wheel extending between the vertical posts 128. The arms 116a and 116b are then swung into position through both wheels and the frame of the bicycle to secure it within the stall. The arms 116a and 116b engage the locking mechanism 112 and the housing 118 respectively. The locking mechanism 112 is then operated to lock the stall and allow removal of a special key for retention by the rider.

It will be noted that a stall identification dial 130 on the stall selection device 122 indicates that there are eight stalls in the bike rack. The illustrated embodiment of the bike rack is provided in basic increments or units of four stalls each. The internal selection mechanism provided on the bike rack shown in FIG. 1 will accommodate up to eight stalls, i.e., an additional four stall unit as shown in FIG. 1 can be attached to the left of the unit shown. For connecting an additional four stall unit, end caps 132 are removed and the two units, associated control cables, etc. are connected together. It is to be understood that although the illustrated embodiment discloses modular units comprising four stalls each, any reasonable number of stalls can be included in each modular unit or a variety of modular units with differing numbers of stalls can be provided. Also, utilizing the illustrated four stall units, a single selection unit could be built to accommodate twelve or possibly sixteen bike stalls. Such modular construction provides versatile expansion capabilities for purchasers of a bike rack in accordance with the invention.

For maximum security of the bike rack, it is preferred that the tubular members be rectangular, oblong or, as shown in FIG. 1A, include a hardened steel member 134 welded to each tubular member. Such tubular structures prevent the use of commonly available pipe cutters which might be utilized by a bicycle thief. It should also be noted that the individual tubular members of each stall are positioned to prevent the unlimited 360° rotational access which is required by such pipe cutters.

Figure 4:
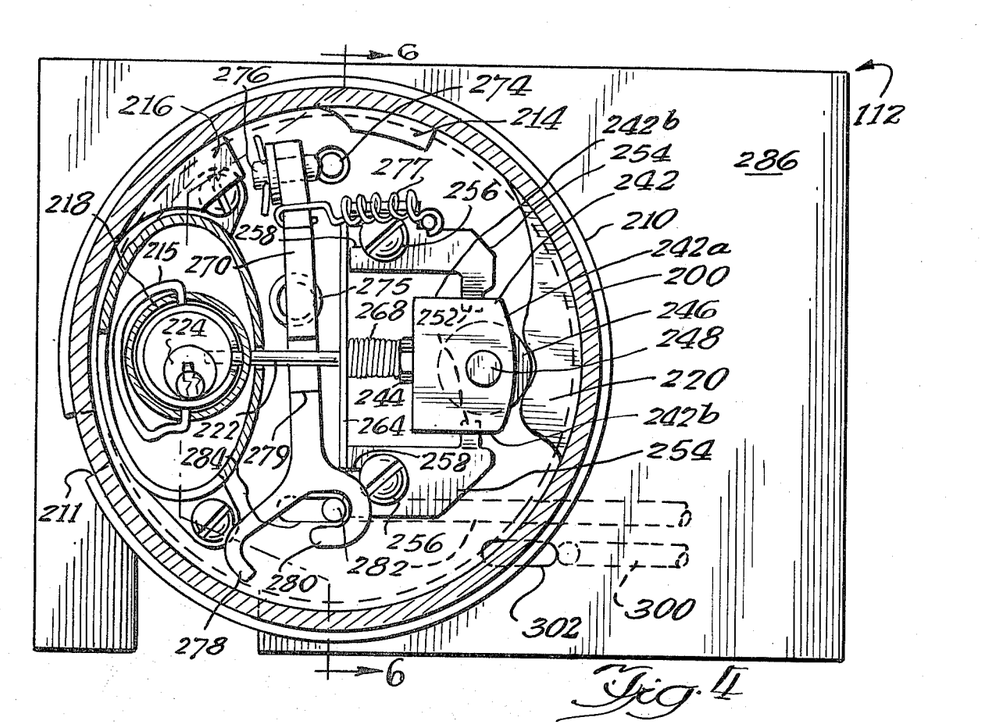
FIG. 4 is a front view of the locking mechanism with the top of the guard cap removed to show the lock and associated locking mechanism in a stall locked position.
Figure 5:
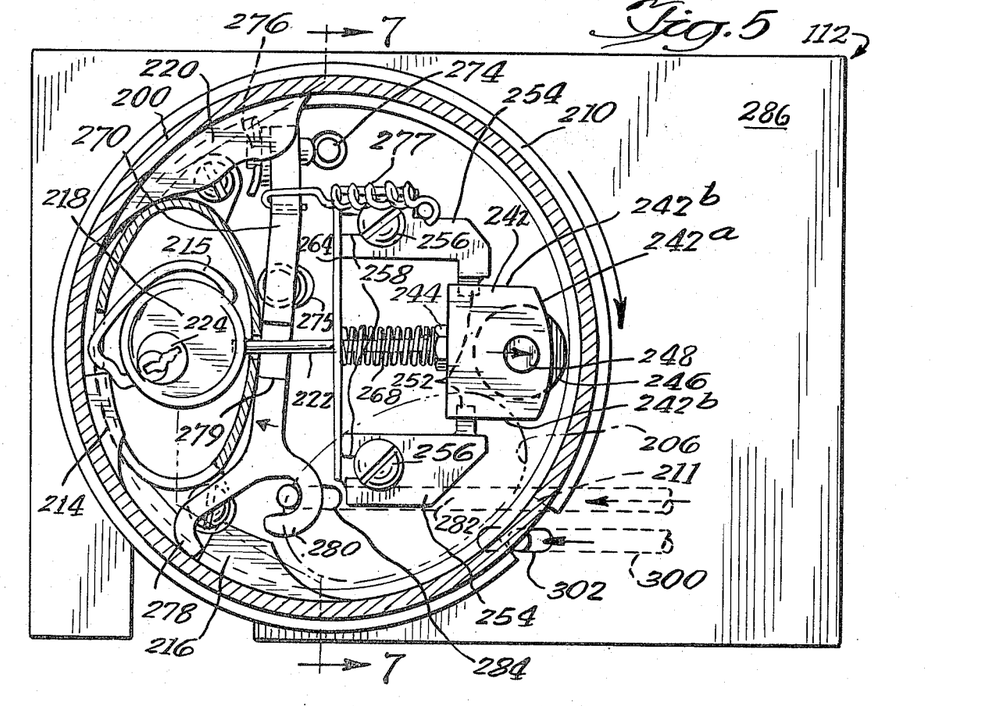
FIG. 5 is a front view of the lock and associated locking mechanism with the top of the guard cap removed in a stall unlocked, key captured position.
Figures 6, 7, 8:
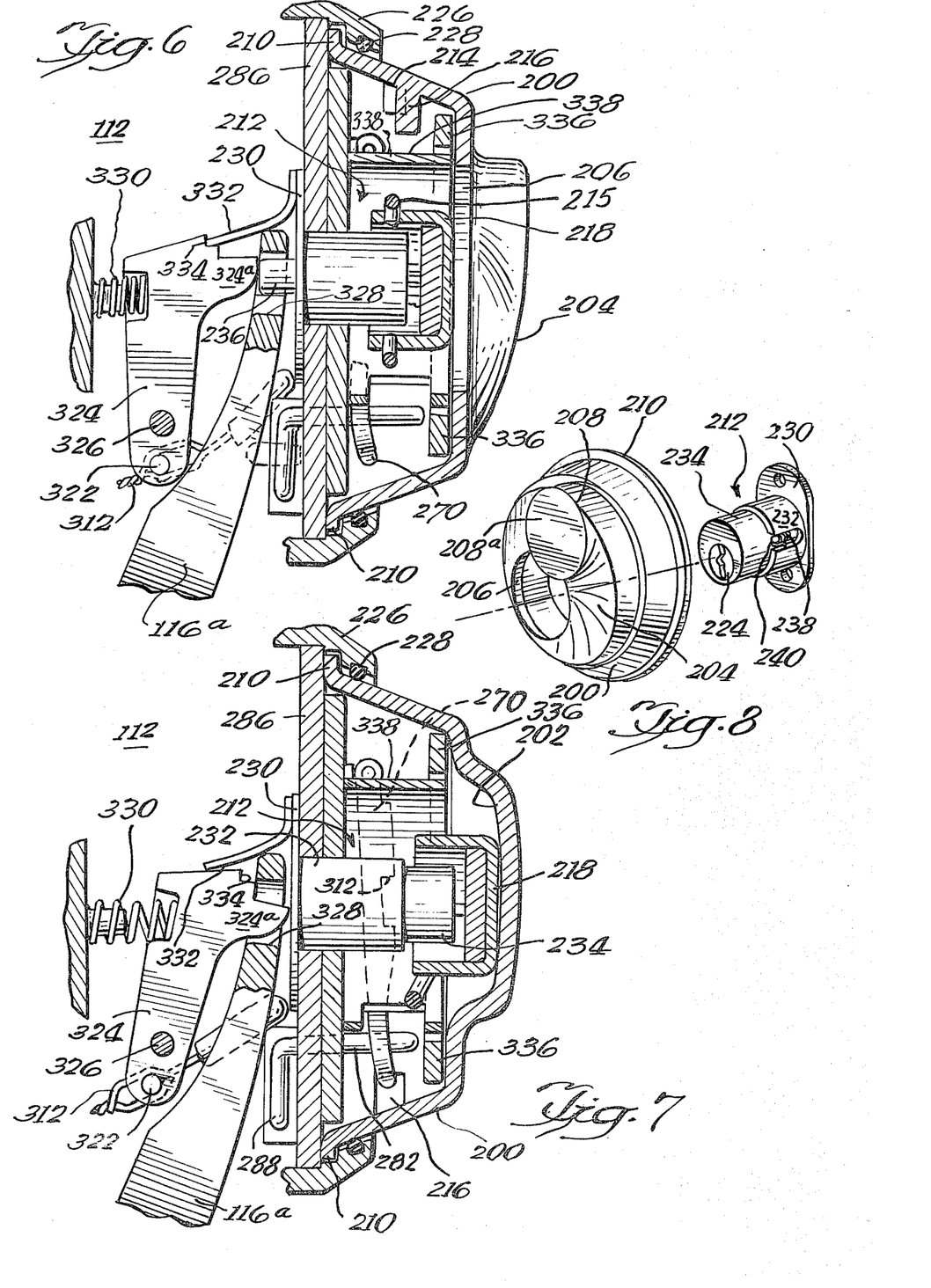
FIG. 6 is a sectional view of the locking mechanism taken along line 6—6 of 4.
FIG. 7 is a sectional view of the locking mechanism taken along line 7—7 of FIG. 5.
FIG. 8 is a pictorial view of the guard cap and associated lock shown in the unlocked position.

FIGS. 2-8 show in detail the structure of an illustrated embodiment of the locking mechanism 112 in accordance with the present invention. The locking mechanism includes a guard cap 200 which extends from the face of the locking mechanism 112 as seen in FIG. 1. The guard cap 200 has a first cam surface 202 which is best seen in FIG. 8 by the external surface 204 of the front of the guard cap 200 which parallels the internal cam surface 202. The cam surface 202 rises from the elliptical key access hole 206 to a generally cylindrical extension 208 on the front of the guard cap 200. Thus, the key access hole 206 is in a first plane and the outer surface 208a of the generally cylindrical extension 208 is in a second plane which is further removed from the face of the locking mechanism 112. The guard cap 200 includes a base flange 210 in a third plane which flange includes a cutout 211 for securing the guard cap against free rotation.

The internal cam surface 202 serves to lock the inexpensive cabinet lock 212 as the guard cap 200 is rotated counterclockwise from the position shown in FIG. 5 to the position shown in FIG. 4. The guard cap also provides for the unlocking of the lock 212 when the guard cap 200 is rotated clockwise from the position shown in FIG. 4 to the position shown in FIG. 5. The unlocking operation is performed by a generally rectangular unlocking tab 214 formed or secured to the inner sidewall surface of the guard cap 200. The unlocking tab 214 engages the wire unlocking member 215 mounted on the special key 218. A second generally rectangular tab 216 serves to lock the guard cap 200 in the position shown in FIG. 5 to capture the special key 218 within the guard cap as will be described hereinafter.

A second cam 220 is provided on the inside sidewall of the guard cap 200 to control the movement of the security pin 222 relative to the lock 212 and lock key cylinder 224. The guard cap 200 is mounted for rotation on the locking mechanism 112 by a plate 226 or other suitable arrangement. The plate 226 allows free rotation of the guard cap 200 and includes a sealing ring 228 or other packing material to protect the locking mechanism 212 from the environment.

The lock 212 is an inexpensive, standardly available cabinet lock which includes a base 230 and a first cylindrical extension 232 extending from the base 230. A spring loaded cylinder 234 extends from the cylindrical extension 232 when the lock is unlocked as shown in FIGS. 7 and 8 and is telescopically depressed within the cylindrical extension 232 when the lock is locked. The cylinder 234 includes a locking pin 236 which extends out the back of the base 230 when the lock is locked and is withdrawn into the cylindrical extension 232 when the lock is unlocked. The standard cabinet lock 212 is modified by a channel 238 which is cut into the side of the cylindrical extension 232 and a hole 240 which is bored into the inner cylinder 234 and the key cylinder 224 to receive the pin 222 to prevent picking of the lock 212 when a bike is locked into the bike rack and left unattended. The insertion and removal of the pin 222 from within the hole 240 of the lock 212 is under the control of the cam 220 located on the inner sidewall of the guard cap 200.

The security pin 222 is firmly mounted to the generally rectangular housing 242 by a nut 244 or by other means. An open end 242a of the housing 242 is rounded to generally conform to the inner surface of the guard cap 200. A roller 246 is mounted for free rotation within the housing 242 on an axle 248 and operates as a cam follower on the operating surface of the cam 220. The housing 242 has slots 250 in the sidewalls 242b to receive tabs 252 of mounting brackets 254. The slots 250 and the tabs 252 are formed to allow free movement of the housing 242, both in a right to left direction as shown by the alternate positions in FIGS. 4 and 5 and also to allow some rotational motion to permit the end of the security pin 222 to move with the inner cylinder 234 of the lock 212 as the lock is locked and unlocked.

The mounting brackets 254 are secured to the locking mechanism 112 via screws 256 which engage slots 258 in the mounting brackets 254 to allow adjustment of the mounting brackets 254 for adjustment of the position of the housing 242. A right angled plate 260 includes extensions 262 which are positioned under the mounting plates 254 and serve as spacers for the mounting plates 254. The mounting plate 260 includes a spring retaining plate 264 which extends at a right angle from the extensions 262 of the plate 260. The security pin 222 passes through a slot 266 in the spring retaining plate 264 and a compression spring 268 extends between the nut 244 and the spring retaining plate 264 to withdraw the pin 222 from the lock 212 when the position of the cam 220 permits.

Figure 2:
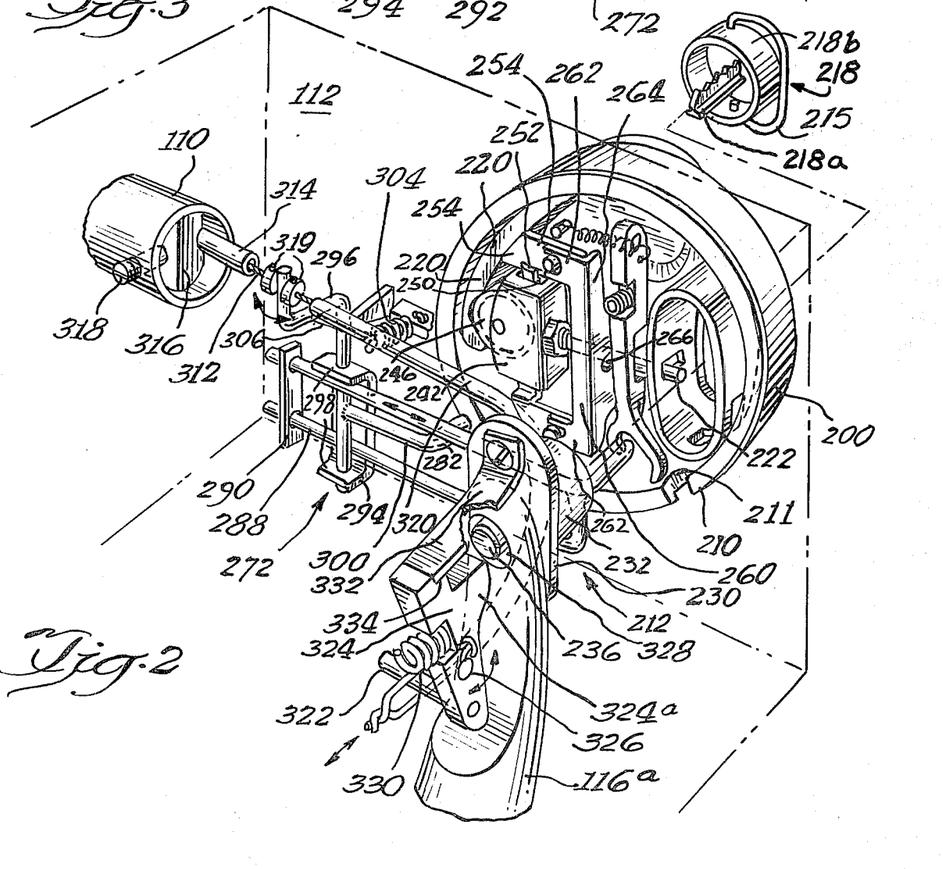
FIG. 2 is a pictorial rear view of the locking mechanism of FIG. 1 in an expanded scale.

As previously mentioned, rotation of the guard cap 200 in a clockwise direction unlocks the lock 212 via the tab 214 engaging the wire unlocking member 215 of the key 218 and secures the guard cap 200 in a fixed position to prevent its rotation to thereby capture the key 218. The special key 218, as best shown in FIG. 2, comprises a shortened or truncated standard toothed key section 218a which is secured to the inner enclosed end of a cylindrical member 218b which has a knurled outer surface. The locking of the guard cap 200 is performed by the control arm 270 in conjunction with the apparatus generally designated 272 and best seen in FIGS. 2 and 3.

The control arm 270 is mounted for rotation about a pin 274 in the plane of the drawings of FIGS. 4 and 5 and also for rotation about a pin 276 for motion perpendicular to that plane. Springs 275 and 277 tend to force the control arm 270 away from the face plate 286 and to the right as shown in FIGS. 4 and 5 respectively. The security pin 222 extends through a channel 279 in the control arm 270. The control arm 270 includes a first pawl 278 which is engaged by the tab 216 and a second pawl 280 which engages the short member of a generally L-shaped rod 282 which extends through an oblong opening 284 in the face plate 286 of the locking mechanism 112. A second L-shaped rod 288 (FIGS. 2 and 3) is secured to the L-shaped rod 282 behind the face plate 286 and the long members of both L-shaped rods 282 and 288 pass through and slidingly engage mounting plates 290 and 292 which are secured to the back of the face plate 286.

A generally U-shaped bracket 294 is securely affixed to the rods 282 and 288. A double bend crank rod 296 is inserted through apertures 298 in the U-shaped member 294 for free rotation of the crank rod about the axis of its longest member. A generally L-shaped rod 300 is securely affixed to the longest member of the crank rod 296 and can be positioned to extend through an oblong hole 302 in the face plate 286 of the locking mechanism 112. A spring 304 connected to the crank rod 296 through extension 306 tends to force the crank rod 296 and the attached L-shaped member 300 against the back surface of the face plate 286 or into the oblong hole 302 in the face plate 286.

In FIG. 2 the tubular member 110 is shown as extending into the locking mechanism 112. A cable 213 which extends from the stall selection device 122 through cable sheath 314 is secured against the inside of the tubular member 110 by a conforming block 316 and set screw 318. The cable 312 extends through the upper operating arm of the crank rod 296 and adjustable collars 319 are secured to the cable on either side of the operating arm so that the cable 312 can move the crank arm rod 296 in both directions and particularly against the force of the spring 304. The cable 312 continues beyond the crank rod 296 through a section of cable sheath 320 to a pin 322 which is connected to the bottom of a latch member 324. The section of cable sheath 320 is secured to the back of the face plate 286 by a bracket 321. The latch member 324 secures the swing arm 116a within the locking mechanism 112 while a bicycle stall is idle. The latch member 324 is mounted for rotation on a pivot pin 326. A pawl 324a engages an aperture 328 in the swing arm 116a. A spring 330 biases the pawl 324a toward the face plate 286 of the locking mechanism 112. A spring member 332 engages an indentation 334 in the upper portion of the latch 324 when the latch is moved a defined distance from the swing arm 116a.

Figure 9:
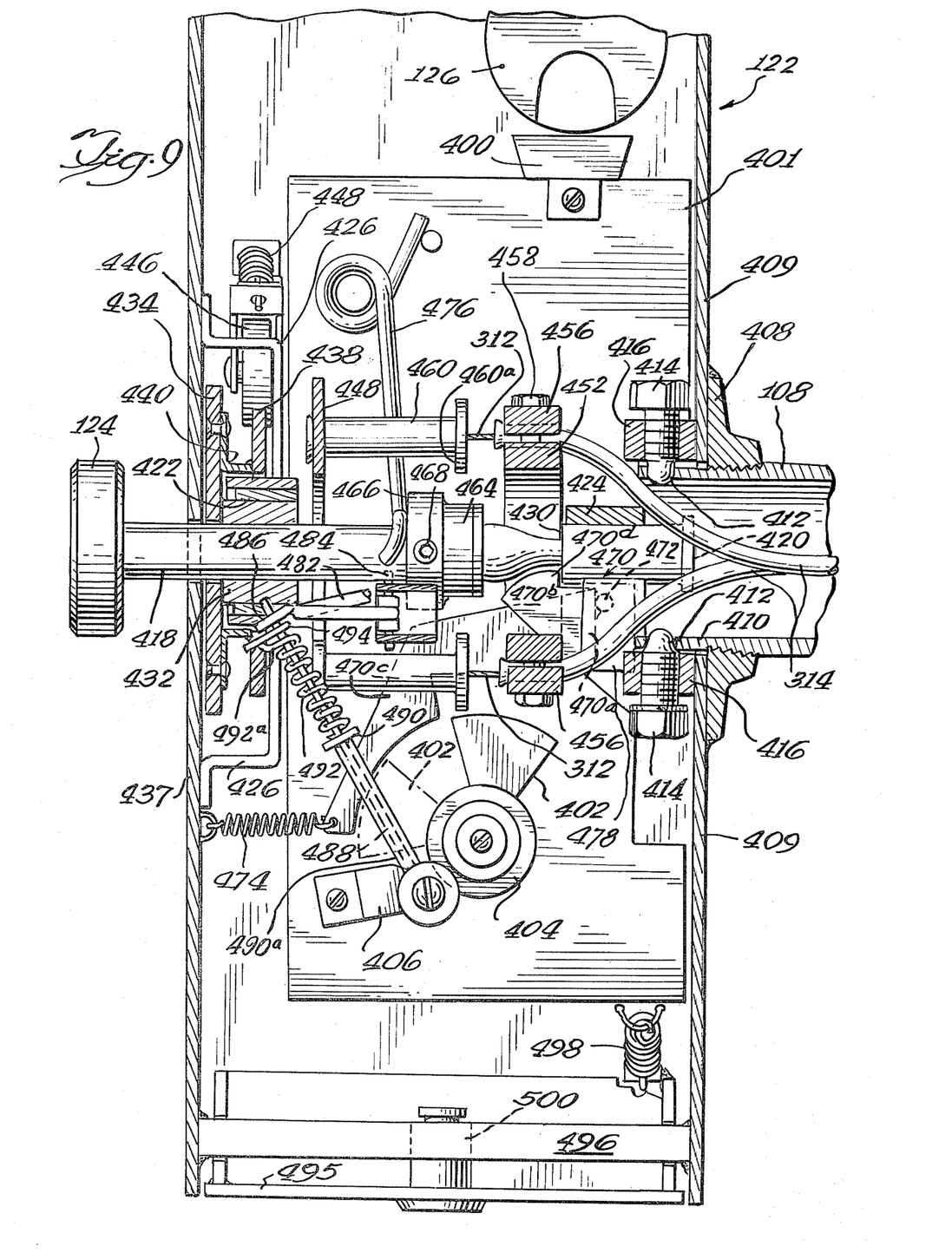
FIG. 9 is a partially sectioned side view of the stall selection device with the side panel removed.
Figure 10:
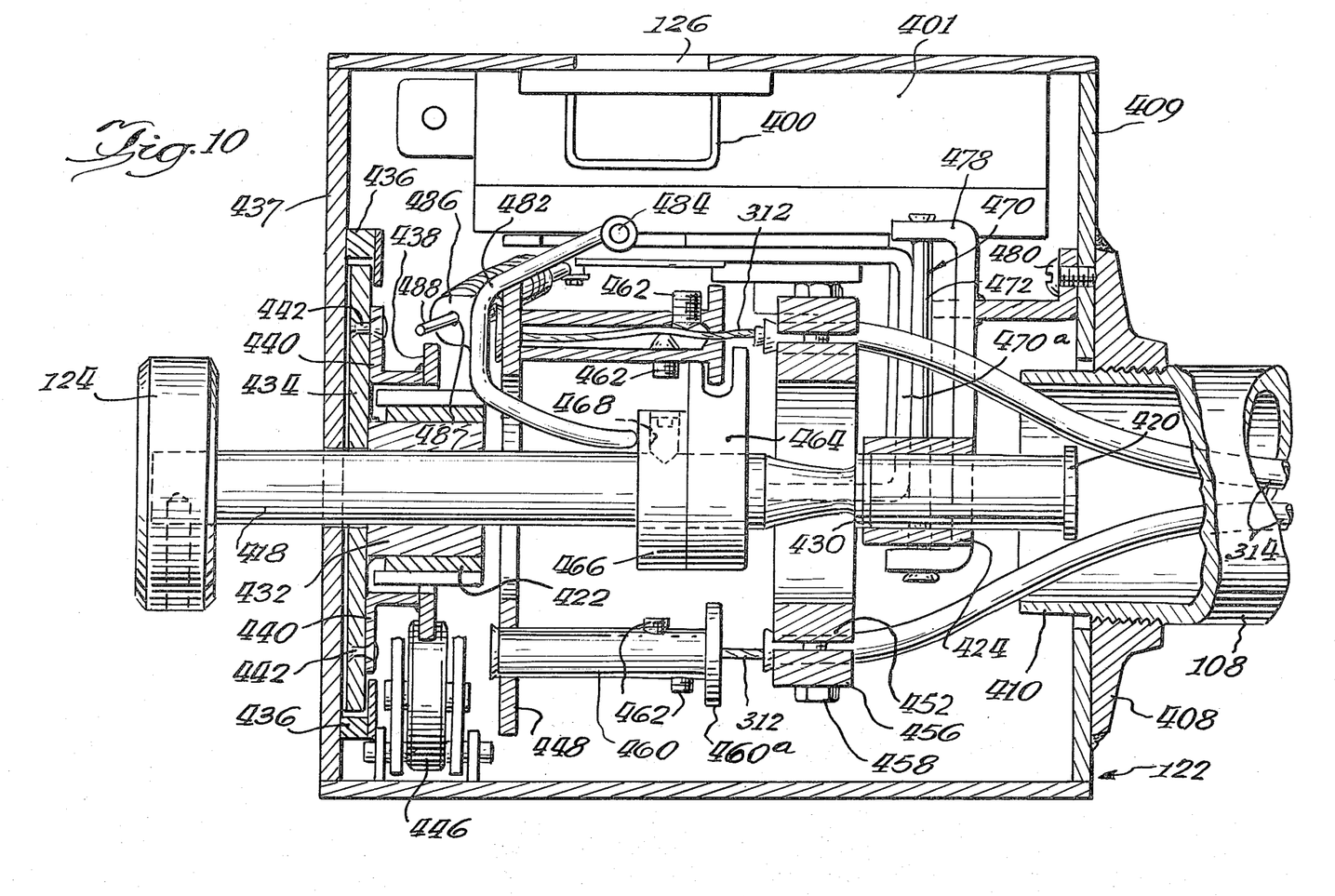
FIG. 10 is a partially sectioned top plan view of the stall selection device.
Figure 11:
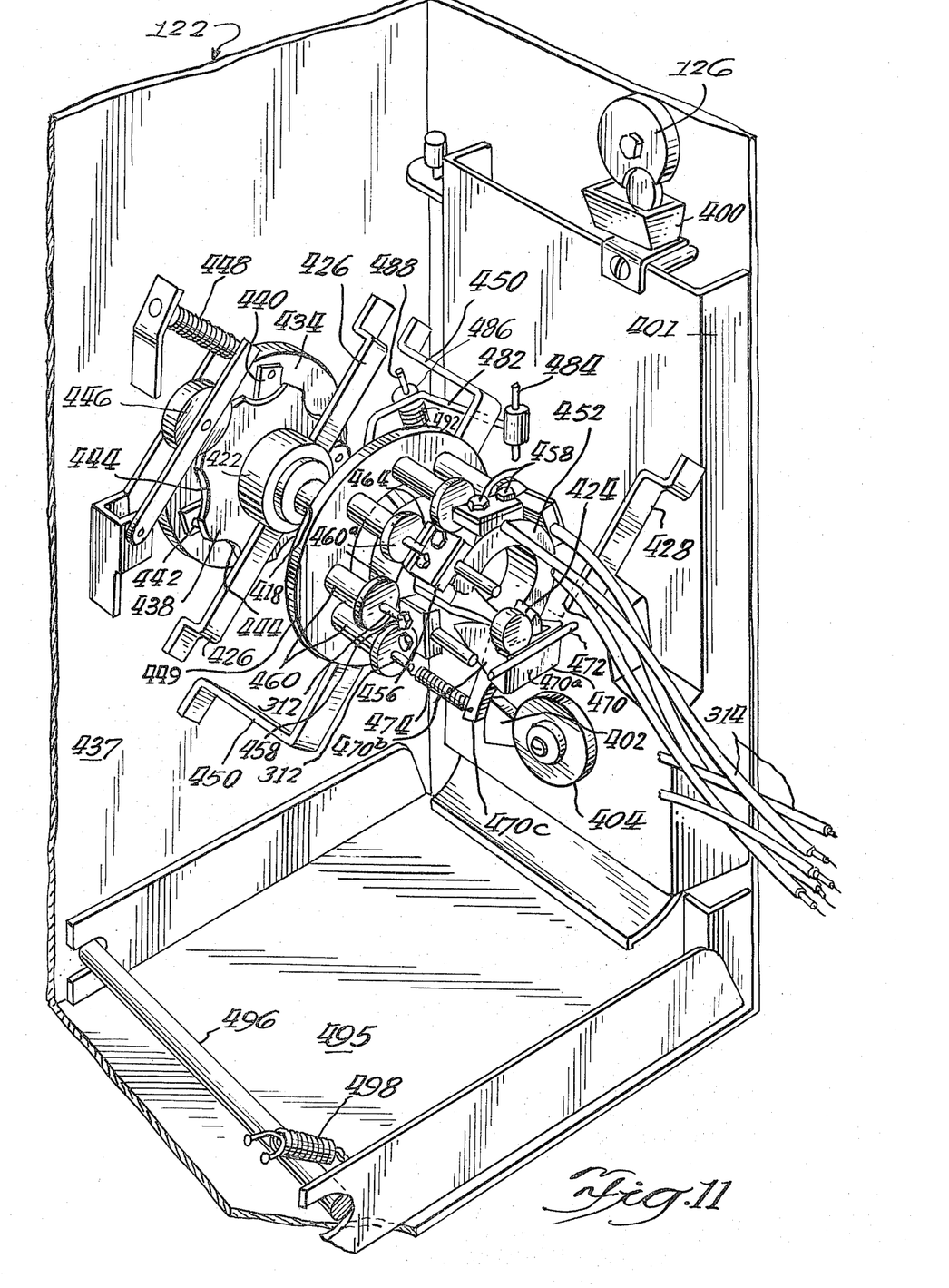
FIG. 11 is a pictorial view of the stall selection device an viewed generally from the direction of the bike rack.

The stall selection device 122 is shown in FIGS. 9–11. The coin reception is managed by a standardly available coin rejector 401 as that commercially available from National Rejectors, Inc. of Hot Springs, Arkansas. When coins are deposited in the coin receptacle 126, they are passed to a coin chute 400 of the coin rejector 401. The coin rejector 401 includes a piece-of-pie shaped sector 402 which is connected to an adjustable control wheel 404 which can be set to respond to a selectable amount of money which can be made up of various combinations of coins. In response to the set amount of money being deposited into the coin slot 126 and passing through the coin rejector 401, the sector 402 is moved from the position shown in dashed lines in FIG. 9 to the position shown in solid lines. The coin rejector is reset by applying a downward force on the reset arm 406 of the rejector. Since the coin rejector per se is not a part of the present invention and its operation is well known in the art of coin rejectors, further description of its operation will not be provided herein.

The tubular member 108 is connected to the stall selection device 122 via the collar 408 which is welded or otherwise secured to the housing wall 409 of the stall selector. The tubular member 108 is screwed into the collar 408 and includes an unthreaded extension 410 which extends into the stall selector. The extension 410 includes a plurality of apertures 412 which are engaged by locking bolts 414. The locking bolts 414 threadedly engage tabs 416 on the inside of the housing wall 409 to prevent unauthorized removal of the tubular member 108 from the stall selector.

The selector knob 124 is connected to a shaft 418 which terminates in stop plate 420. The shaft 418 is supported by two cylindrical bearings 422 and 424 which are connected to the front and back walls respectively of the selector device housing by brackets 426 and 428. A section of the shaft 418, approximately two-thirds of the distance from the knob 124 to the stop 420, is machined to form an annular surface 430. The shaft 418 slidingly engages a collar 432 and a ratchet support plate 434 which is welded or otherwise firmly affixed to the collar 432. The shaft 418 engages the collar 432 and the ratchet support plate 434 by splines, keys and keyways or other appropriate means so that when the stall selector knob 124 and the shaft 418 are rotated, the collar 432 and attached ratchet support plate 434 will rotate with the shaft 418. However, the shaft 418 can slide axially relative to the collar 432 and the ratchet support plate 434. Brackets 436 and housing wall 437 maintain the position of the collar 432 and the attached ratchet support plate 434 during axial movement of the shaft 418.

A ratchet plate 438 includes a plurality of brackets 440 which are welded or otherwise firmly attached to the ratchet plate 438 and, in turn, riveted by rivets 442 or otherwise firmly affixed to the ratchet support plate 434. The ratchet plate 438 is generally circular in configuration and includes a plurality of semicircular indentations 444, the number of indentations corresponding to the number of bicycle stalls (actual or potential) for the bicycle rack, and serve to firmly position the shaft 418 to correspond to individual ones of those stalls. The semicircular indentations 444 are designed to receive a ratchet wheel 446 which is spring loaded by a spring 448 and thereby forced against the indented edge of the ratchet plate 438. The spring loaded wheel 446 firmly, yet yieldingly engages the semicircular indentations 444 as the selector knob 124 and the shaft 418 are rotated.

An annular member 449 is concentrically located about the shaft 418 and firmly affixed to the housing wall 437 of the selector mechanism 122 by means of brackets 450. A second annular member 452 is similarly positioned concentrically about the shaft 418 and positioned approximately over the machined portion of the shaft 418 which forms the annular shaft 430 and is attached to the stall selector housing via brackets (not shown). The annular rings 448 and 452 support the stall operation cables 312 and their associated cable sheaths 314. The cable sheaths 314 are clamped to the outer periphery of the annular member 452 via cable conforming blocks 456 which are secured to the annular member 452 by bolts 458. The annular member 448 includes a plurality of holes for receiving cable operation cylinders 460 for sliding engagement therein. Each of the cable operating cylinders 460 includes an operating flange 460a at one end and an axial opening for receiving one of the cables 312. Set screws 462 are included in the cylindrical members 460 for securing the cables 312.

A cable operating fork 464 is firmly affixed to a collar 466, both of which are fitted over the shaft 418 and secured thereto by set screw 468. The cable operating fork 464 is positioned relative to the shaft 418 so that when the shaft is radially positioned to select a given stall and held in that position by the ratchet plate 438 and the spring loaded ratchet wheel 446, the cable operating fork 464 will be aligned with and engage the associated cable receiving cylinder flange 460a.

Activating opertion of the shaft 418, i.e., axial movement away from the stall selection device 122, is coupled to the coin rejector 401 by means of a bracket 470. The bracket 470 includes a base plate 470a with a rod 472 welded or otherwise firmly affixed thereto near the upper portion of the base plate 470a. Two operating members 470b and 470c extend generally perpendicularly from the base plate 470a. The operating member 470b extends generally above the base plate 470a and includes a pawl 470d which engages the annular surface 430 formed in the shaft 418. The operating member 470c extends generally below the base plate 470a and includes a lower portion designed to engage the piece-of-pie shaped sector 402 of the coin rejector 401 prior to the time that the sector 402 is rotated to the solid line position shown in FIG. 9 due to the deposit of a required number of coins. The bracket 470 is biased toward the position shown in the figures by the spring 474.

The sector 402 restricts the movement of the bracket 470 so that the shaft 418 cannot be moved axially to the left to release a selected stall until the proper number of coins have been deposited. Once the proper number of coins have been deposited, the sector 402 is moved to the solid line position shown in FIG. 9 and the shaft 418 can be pulled axially to the left as shown in FIG. 9 against the force of the spring 474 which acts through the bracket 470 and the force of a much stronger shaft return spring 476.

As the shaft 418 is moved axially away from the stall selection device 122, the bracket 470 pivots about the rod 472 which is mounted for free rotation in the generally U-shaped framework 478 which is secured to the housing wall 409 of the stall selector device 122 by the screw 480 and attachment to the fixed outer surface of the bearng 424. As the shaft 418 is moved axially away from the stall selector device 122, the lower portion 470c of the bracket 470 swings into the position previously occupied by the piece-of-pie shaped sector 402 of the coin rejector 401 against the force of the spring 474. The selected cable 312 is pulled by the cable activating fork 464 via the associated cable receiver cylinder flange 460a. The coin rejector reset arm 406 is also readied for resetting of the coin rejector.

The coin rejector 401 is reset by the generally U-shaped member 482 which is pivotally mounted on pin 484. A plate 486 including a central hole 487 is attached to the bottom portion of the U-shaped member 482. A reset activating rod 488 is pivotally connected to the reset arm 406 and extends through the hole 487 in the plate 486. A spring retaining plate 490 including a cylindrical extension 490a slidingly encompasses the reset activating rod 488. An offset washer 494 is positioned next to the plate 486 and surrounds the reset activating rod 488. A compression spring 492 is positioned between the spring retaining plate 490 and the offset washer 494 and concentrically surrounds the reset activating rod 488. The upper end of the spring 492 includes an offset extension 492a which engages the offset washer 494.

As the shaft 418 is moved axially away from the stall selection device 122, the collar 466 engages and pivots the generally U-shaped member 482 about the pin 484. The generally U-shaped member 482 and the attached plate 486 are shaped such that as the member 482 pivots about the pin 484, the compression spring 492 is compressed, and a force is placed upon the spring retaining plate 490 and cylindrical extension 490a and the offset washer 494. This force is applied through the cylindrical extension 490a to the rest arm 406, however, the force is not immediately effective to reset the coin rejector mechanism 401 because the lower portion 470c of the bracket 470 obstructs the movement of the sector 402 into its dashed line position shown in FIG. 9. Once the spring 492 is compressed, the arrangement of the offset washer 494 and the spring extension 492a locks onto the rod 488 to maintain spring pressure on the spring retaining plate 490 and cylindrical extension 490a as the shaft 418 is returned to its original position primarily by the spring 476. At the time the lower portion 470c of the bracket 470 clears the area required to be occupied by the sector 402 for the coin rejector mechanism to be reset, the force on the cylindrical extension 490a due to the spring 492 acting against the spring stop 490 forces the reset arm 406 downwardly to reset the coin rejector 401 and move sector 402 to its dashed position shown in FIG. 9. The downward motion of the reset arm 406 relieves the compression of the spring 492 sufficiently to release the lock of the offset washer 494 on the rod 488 so that the spring 492 returns to its rest position.

The bottom housing wall 495 of the stall selection device 122 is hinged about shaft 496 and biased toward a closed position by a spring 498. A lock 500 secures the housing bottom wall 495 in a closed position while allowing for the removal of a coin box (not shown) which is positioned to receive coins from the coin rejector 401.

The operation of the locking bike rack in accordance with the present invention will now be described for a typical sequence of user operation. When a bicycle rider approaches the bike rack 100, the guard cap 200 is locked into the position shown in FIG. 5 by the short leg of the L-shaped member 300 extending through the oblong hole 302 and engaging the cutout 211 in the flange 210 of the guard cap 200. The bicycle rider approaches the stall selector device 122 and initially rotates the stall selector knob 124 to select an idle stall. For example, the indicator on the knob 124 can be turned in point toward stall 1 as shown in FIG. 1. The circular indentation corresponding to stall 1 on the ratchet plate 438 is engaged by the spring loaded wheel 446. Similarly, the cable activating fork 464 engages the flange 460a of the cylindrical member 460 which is secured to the cable 312 which passes through the tubular member 108 and the tubular member 110 to operate the locking mechanism 112 of stall 1.

The bicycle rider, if he has not done so previously, must then deposit the required amount of money to activate the coin rejector 401 into the coin slot 126 to rotate the piece-of-pie shaped sector 402 out of an interference position with the lower portion 470c of the bracket 470. The bicycle rider then pulls the selection knob 124 outwardly away from the stall selection device 122 to pull the cable 312 going to stall 1.

Figure 3:
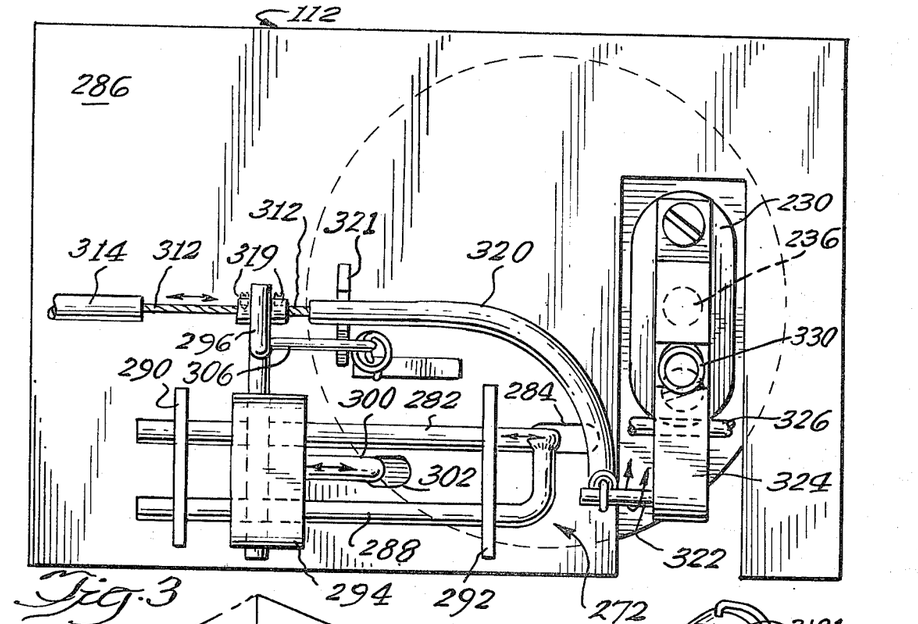
FIG. 3 is a rear view of the locking mechanism to show the operating cable and a portion of the locking mechanism.

The selected cable 312 pulls the crank rod 296 to rotate the L-shaped member 300 out of the oblong hole 302 and the cutout 211 of the flange 210 of the guard cap 200. The pull of the cable 312 also causes the members 282 and 288 to slide to the left as shown in FIGS. 2 and 3 (to the right as shown in FIGS. 4 and 5) and rotate the control arm 270 about the pin 274 from the position shown in FIG. 5 to the position shown in FIG. 4. Concurrently with this motion of the apparatus 272, the cable 312, through cable sheath section 320, pulls pin 322 to remove the latch pawl 324a from the hole 328 in the swing arm 116a. The latch 324 is locked in an open position by the spring member 332 which engages the indentation 334 in the upper portion of the latch 324. The guard cap 200 is then free to rotate and the bifurcated swing arm 116 is released and can be swung out of the selected stall. The shaft 418 and the selector knob 124 return to their original position primarily under the control of the spring 476 and the coin rejector 401 is reset as previously described.

A bicycle rider next rotates the swing arms 116a, 116b on tubular member 114a to remove them from the stall and positions his bicycle within the stall with the front wheel between the two vertical members 128. The swing arms 116a, 116b are swung into the bicycle and through both wheels and the frame of the bicycle with swing arm 116a entering the locking mechanism 112 and the swing arm 116b entering the housing 118. When the swing arm 116a swings into position in the locking mechanism 112, the tip of the swing arm strikes the spring member 332 disengaging it from the indentation 334 in the upper portion of the latch 324.

The bicycle operator next rotates the guard cap 200 counterclockwise from the position shown in FIG. 5 to the position shown in FIG. 4. The unlocking tab 214 passes under the control arm 270 which is raised due to the unlocked condition of the lock 212. As the guard cap 200 is rotated counterclockwise, the inner cam surface 202 of the guard cap depresses the key 218 and forces the lock 212 into a locked position such that the locking pin 236 extends into the aperture 328 of the swing arm 116a to securely lock it in position. The locking pin 236 is entering the aperture 328, forces the pawl 324a of the latch 324 to an unlatched position where it is again secured by the spring member 332 engaging the indentation 334 in the upper portion of the latch 324.

The counterclockwise rotation of the guard cap 200 into the position shown in FIG. 4 places the elliptical key access hole 206 over the key 218 and lock 212. In the event that the cam surface 202 on the inside of the guard cap has not fully locked the lock 212, the bicycle rider can depress the key 218 to lock the lock 212. The bicycle rider then removes the key 218 by swinging the wire unlocking member 215 into the access hole 206 and pulling the key through the access hole by this wire.

As the guard cap 200 was rotated from the position shown in FIG. 5 to the position shown in FIG. 4, the security pin 222 was inserted into the hole 240 of the lock 212 under the influence of the cam 220 on the inside surface of the sidewall of the guard cap 200. As previously described, the security pin 222 prevents picking of the lock 212 while a bike is locked within a stall of the bike rack 100. Baffles 336 and 338 are provided within the guard cap 200 to prevent access to the inside of the guard cap while the access hole 206 is rotated away from the key and lock. The bicycle rider can now go about his business with the peace of mind that his bicycle is securely locked within the bike rack in accordance with the present invention.

Upon return to the bike rack to retrieve his bicycle, the rider will rotate the guard cap to the position shown in FIG. 4 to allow insertion of the key through the access hole 206. It is noted that the guard cap can rotate from the position shown in FIG. 4 to the position shown in FIG. 5 freely while a stall is occupied. The rider places the key 218 into the access hole 206 to engage the lock 212. The wire operation member 215 is moved downwardly into the proper position for unlocking the bicycle stall.

The bicycle rider next rotates the guard cap clockwise from the position shown in FIG. 4 to the position shown in FIG. 5. As the guard cap is so rotated, the security pin 222 is retracted from the hole 240 in the lock 212 by the cam 220 to allow rotation of the key 218. The unlocking tab 214 on the inside of the guard cap passes over the pawl 278 of the control arm 270 and engages the wire operating member 215 on the key 218. Further clockwise rotation of the guard cap 200 rotates the key 218 to unlock the lock and the spring loaded cylinder 234 springs out of the cylindrical extension 232 of the lock 212. This raises the security pin 222 allowing the control arm 270 to rise to the position shown in FIG. 7 under the influence of the spring 275. in this position, a slight additional rotation of the guard cap 200 in the clockwise direction engages the tab 216 with the pawl 278 moving the pawl 280 and the short leg of the L-shaped member 282 to the left as shown in FIGS. 4 and 5. This causes the members 282 and 288 to slide to the right as shown in FIGS. 2 and 3.

This sliding motion of the apparatus 272 moves the short leg of the L-shaped member 300 into a position over the oblong hole 302 and due to the force of the spring 304, the short leg of the L-shaped member 300 pops through the hole 302 engaging the cutout 211 of the flange 210 of the guard cap 200 securely locking the guard cap from any further rotation and capturing the key 218 therein. At this point, the bicycle rider can once again swing the swing arms 116a, 116b out of the stall, remove his bicycle from the stall and allow the swing arms to return to the closed position under the force of gravity. As the swing arm 116a swings into position in the locking mechanism 112, the spring member 332 is disengaged from the indentation 334 of the latch 324 and the pawl 324a engages the aperture 328 of the swing arm 116a. This prevents use of the stall until coins are again deposited into the coin slot 126 of the stall selection device 122.

From the above description, it is apparent that a coin operated locking bicycle rack for securely locking bicycles into individual stalls has been achieved to free bicycle riders from the burden of carrying heavy chains, cables and locks. While only an illustrative embodiment has been set forth, alternative embodiments and various modifications will be apparent from the above description to those skilled in the art. For example, various guard cap securing arrangements could be provided to capture the key within the guard cap while a stall is unoccupied. Similarly, alternate cable selection and operating arrangements could be provided by those skilled in the art. These and other alternatives are considered equivalents and within the spirit and scope of the present invention. While the illustrative embodiment provides for an initial bike rack having four stalls and is expandable in four stall units, units of any reasonable number of stalls can be provided and that number or another number of stalls can be used for expansion units of a basic bicycle rack to a selective ultimate number of stalls.

What is claimed is:

1. A coin operated locking bicycle rack comprising:
a plurality of stalls having first and second sides for receiving bicycles therebetween;
a plurality of arms being mounted to said first sides of said stalls and being adapted to selectively traverse the stalls to engage bicycles positioned within said stalls;
a plurality of locking means being mounted to said second sides of said stalls for receiving and locking said arms in a bicycle securing position wherein said arms traverse said stalls; and
centrally located stall control means for selecting an unoccupied stall and including coin responsive means for enabling the operation of said stall control means to release the locking means of said selected stall and accordingly said selected stall whereby a bicycle can be inserted and locked thereinto by said selected stall locking means.

2. The bicycle rack of claim 1 wherein said arms are bifurcated to pass through both wheels and a frame opening of bicycles inserted into said stalls.

3. The bicycle rack of claim 2 wherein said arms are pivotally mounted to said first sides of said stalls to swing across said stalls and each of said arms includes a counterbalance weight which forces said swing arms to traverse said stalls under the force of gravity.

4. The bicycle rack of claim 1 wherein each of said plurality of locking means comprises:
a lock for selectively engaging said arms;
a lock cover movable between a first position which allows access to said lock and a second position which obscures said lock; and
lock cover securing means connected to said stall control means for securing said lock cover in said second position.

5. The bicycle rack of claim 4 wherein said lock cover is generally circular and is movable by rotation about a central axis.

6. The bicycle rack of claim 4 wherein each of said locking means further comprises movable lock securing means, each of said locks being adapted to receive said lock securing means, and each of said lock covers including operating means for moving said lock securing means from a lock securing position to a lock free position as said lock cover is moved from said first position to said second position whereby said lock can be unlocked only when obscured by said lock cover.

7. The bicycle rack of claim 4 wherein each of said plurality of locking means further comprises latch means connected to said stall control means for securing said arms across said stalls when said stalls are unoccupied whereby nonpaying persons are unable to utilize said bicycle rack.

8. The bicycle rack of claim 7 wherein said lock cover includes operating means for engaging said key as said lock cover is moved from said first position to said second position to unlock said lock.

9. The bicycle rack of claim 4 wherein said lock includes a key for operation, and said lock cover protects said lock and said key from vandalism and removal by nonpaying persons.

10. The bicycle rack of claim 9 wherein said key comprises:
a cylindrical housing closed at one end; and
truncated key means substantially contained within said cylindrical housing and being affixed to the inside of the closed end of said cylindrical housing and extending toward the open end of said cylindrical housing.

11. The bicycle rack of claim 9 wherein said lock cover includes operating means for engaging said key as said cover is moved from said second position to said first position to lock said lock.

12. The bicycle rack of claim 1 wherein said centrally controlled stall control means comprises:
a plurality of cables, each of said cables corresponding to and being extended and connected to one of said plurality of locking means; and
cable control means for selecting and operating one of said plurality of cables.

13. The bicycle rack of claim 12 wherein said cable control means comprises:
annular means having an axis and receiving and mounting said plurality of cables for operation at a plurality of radial locations about said annular means;
shaft means having an axis and being mounted for both rotational and axial motion and having its axis aligned with said axis of said annular means; and
cable operating means firmly affixed to said shaft means and being positioned to selectively engage one of said plurality of cables for operation whereby selection of one of said plurality of cables is performed by rotation of said shaft means to properly position said cable operating means and operation of said selected cable is performed by axial motion of said shaft means.

14. The bicycle rack of claim 13 further comprising ratchet means to maintain the rotation position of said shaft means at positions which correspond to selected cable operating positions.

15. The bicycle rack of claim 13 wherein said shaft means is coupled to said coin responsive means.

* * * * *